March 22, 1960 J. R. CARPENTER 2,929,092
CASTERS
Filed July 2, 1957 2 Sheets-Sheet 1
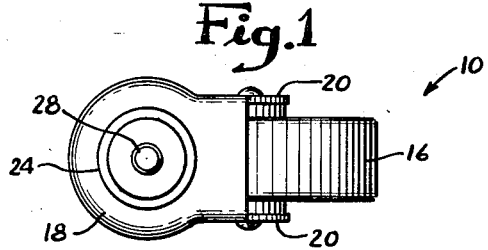
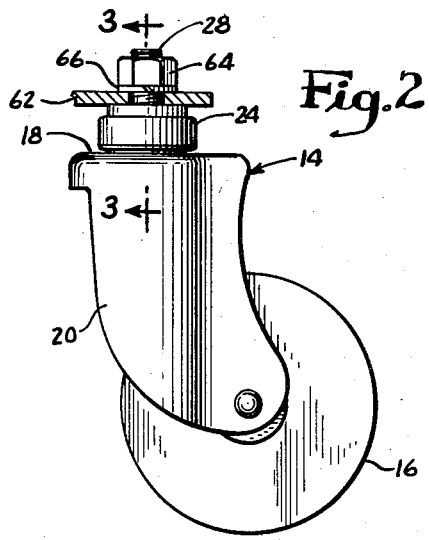
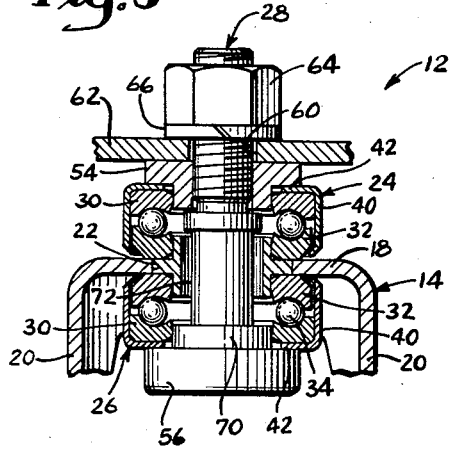
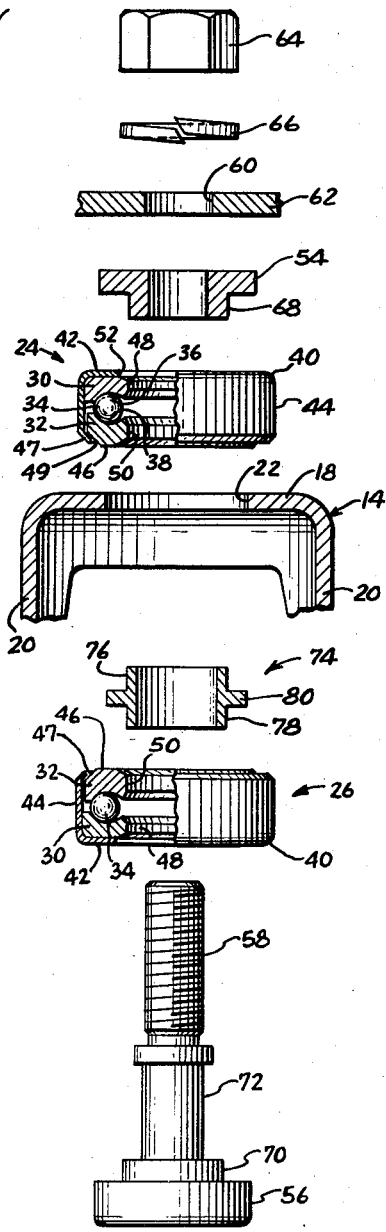
INVENTOR
JAMES R. CARPENTER
by: Ooms, McDougall, Williams & Hersh
ATTYS.

March 22, 1960     J. R. CARPENTER     2,929,092
CASTERS
Filed July 2, 1957     2 Sheets-Sheet 2
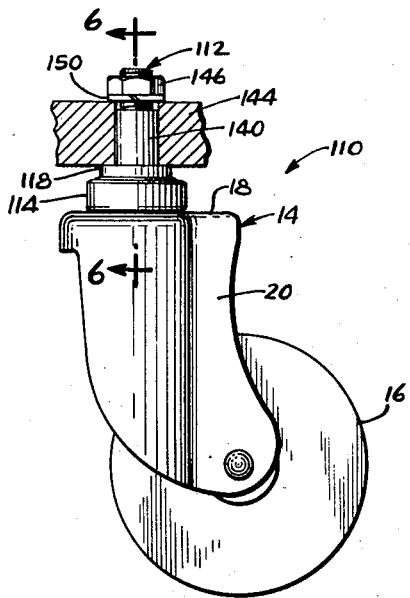
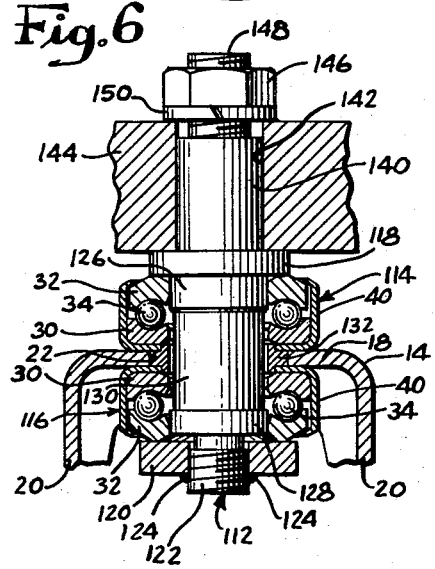
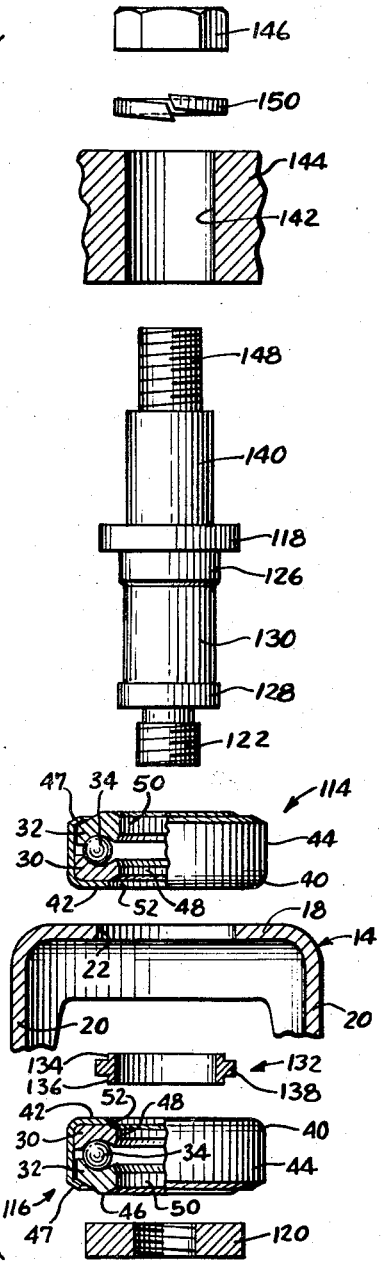
INVENTOR
JAMES R. CARPENTER
by: Ooms, McDougall, Williams & Hersh
ATTYS.

United States Patent Office 2,929,092
Patented Mar. 22, 1960

2,929,092

CASTERS

James R. Carpenter, Jackson, Mich., assignor to Sides Manufacturing Co., Chicago, Ill.

Application July 2, 1957, Serial No. 669,477

7 Claims. (Cl. 16—21)

This invention relates to casters, and pertains particularly to swivel constructions for casters.

One object of the present invention is to provide casters having new and improved swivel constructions utilizing heavy duty ball bearing units so that the casters will be able to carry heavy loads, yet will always swivel freely.

A further object is to provide new and improved swivel constructions which are extremely rugged yet are easy to manufacture.

It is a further object to provide new and improved ball bearing swivel constructions which seal out dust and dirt, while providing a permanent grease seal, and in which no balls are visible.

Another object is to provide casters having new and improved swivel constructions utilizing standard ball thrust bearing units.

It is another object to provide casters having new and improved swivel constructions which are easily made at low cost.

Further objects and advantages of the present invention will appear from the following description, taken with the accompanying drawings, in which:

Fig. 1 is a plan view of a caster to be described as one illustrative embodiment of the present invention.

Fig. 2 is an elevational view of the caster of Fig. 1.

Fig. 3 is a fragmentary enlarged elevational sectional view, taken generally along a line 3—3 in Fig. 2.

Fig. 4 is an exploded elevational sectional view of the caster of Fig. 1.

Fig. 5 is an elevational view of a somewhat modified caster, to be described as a second illustrative embodiment of the invention.

Fig. 6 is a fragmentary enlarged elevational sectional view, taken generally along a line 6—6 in Fig. 5.

Fig. 7 is an exploded elevational sectional view of the modified caster of Fig. 5.

As already indicated, Figs. 1–4 illustrate a caster 10 having a swivel construction 12 arranged in accordance with the present invention. It will be seen that the caster 10 has a wheel housing or support 14, generally of inverted U shaped construction with a wheel 16 mounted thereon. More specifically, the wheel support 14 has a top wall 18 formed with a pair of spaced depending legs 20. The wheel 16 is mounted between the legs 20. The wheel support 14 may be formed in one piece from sheet metal or the like. A bore or opening 22 is provided in the top wall 18 to receive the swivel unit 12.

It will be seen that the swivel 12 comprises upper and lower ball bearings 24 and 26 with a pin or shaft 28 extending therethrough. As illustrated, the ball bearings 24 and 26 are the same in construction, but are inverted in position with respect to each other. Thus, for the most part, a single description will serve for both bearings 24 and 26.

Each of the ball bearings 24 and 26 has two race rings 30 and 32 with a plurality of balls 34 therebetween. The balls 34 actually run along a downwardly facing channel 36 in the upper ring 30 and an upwardly facing channel 38 in the lower ring 32, so that the bearing will support a heavy thrust load.

The race rings 30 and 32 are partly enclosed within a cup shaped housing 40 having a flat end wall 42 and a cylindrical side wall 44. The race ring 30 is seated against the end wall 42 and thus is largely or substantially enclosed by the housing 40. On the other hand, the race ring 32 projects outwardly from the housing 40 and has an exposed annular end face 46. Normally, thrust is applied to the bearing between the end face 46 and the end wall 42 of the housing 40. The housing 40 normally rotates with the race 30, while the race 32 rotates freely within the housing 40. An inturned annular lip 47 is formed on the housing side wall 44 to retain the race ring 32 in the housing, the ring 32 being formed with a beveled surface 49 to cooperate with the lip 47. Axial bores or apertures 48 and 50 are formed in the rings 30 and 32, while a slightly larger bore or aperture 52 is formed in the end wall 42 of the housing 40.

As already indicated, the upper and lower bearings 24 and 26 are reversed in position with respect to each other. In the case of the upper bearing 24, the ring 30 is disposed above the ring 32, so that the end face 46 on the ring 32 engages the upper side of the top wall 18 around the opening 22. The housing 40 of the upper bearing 24 is inverted in position, so that the end wall 42 faces upwardly.

In the case of the lower bearing 26, the ring 30 is below the ring 32, and the housing 40 is upright in position. The end face 46 on the ring 32 engages the underside of the top wall 18 around the opening 22.

It will be seen that the shaft or pin 28 is formed with upper and lower head means 54 and 56 which retain the upper and lower bearings 24 and 26 against endwise movement with respect to the wheel support 14. In this case, the lower head means 56 take the form of an actual enlarged head formed integrally with the pin 28 and engaging the end wall 42 on the housing 40 of the lower bearing 26. The upper head means 54 take the form of a nut or collar which is threadedly mounted on the pin 28, a threaded upper portion 58 being provided on the pin 28 to receive the nut 54. It will be understood that the nut 54 is adjustable along the pin 28 to take up any endwise play between the bearings 24 and 26 and the wheel support 14. The nut 54 may be staked or otherwise secured in its adjusted position, if this is desired.

In this case, the threaded upper portion 58 of the pin 28 is also employed to mount the caster 10 on a cart or other device. As illustrated, the threaded portion 58 extends through an aperture 60 in a frame plate or other member 62. A nut 64 is employed to clamp the plate 62 against the nut 54. A lock washer 66 may be inserted between the nut 64 and the plate 62.

The shaft or pin 28 is provided with upper and lower centering elements 68 and 70 which are closely received within the apertures 48 in the upper race ring of the upper ball bearing 24 and the lower race ring of the lower ball bearing 26. In this case, the upper centering element 68 takes the form of a reduced lower portion on the nut 54. The lower centering element 70 is shown as an integral portion of the pin or shaft 28, disposed immediately above the head 56. It will be seen that the shaft 28 has an intermediate portion 72 which is reduced with respect to the centering portion 70.

The ball bearings 24 and 26 are centered with respect to the opening 22 by means of a bushing 74 having upper and lower end portions 76 and 78 which are closely received within the bores 50 in the lower race of the upper bearing 24 and the upper race of the lower bearing 26. The bushing is received around the reduced intermediate portion 72 of the shaft 28, with clearance therebetween. An enlarged central or intermediate flange 80 is formed on the bushing 74 and is closely received within the opening 22 in the wheel support 14. Thus, the bushing 74 prevents the race rings 32 of the upper and lower bearings 24 and 26 from shifting laterally with respect to the opening 22. The intermediate flange 80 is of a thickness corresponding to that of the top wall 18 so that the flange 80 is closely received between the end faces 46 on the upper and lower bearings 24 and 26.

In use, the top wall 18 of the wheel support 14 is securely received between the lower race ring 32 of the upper bearing 24 and the upper race ring 32 of the lower bearing 26. Accordingly, these race rings 32 rotate with the wheel housing 14 when the caster swivels. The upper race 30 of the upper bearing 24 and the lower race 30 of the lower bearing 26 are held non-rotatable with the shaft or pin 28 as the caster swivels. The housing 40 of the bearings 24 and 26 are effectively secured to the races 30 and thus are held non-rotatable with the shaft 28.

The bushing 74 maintains the bearings 24 and 26 in centered relation to the opening 22 in the top wall 18. Rocking movement of the wheel support 14 with respect to the pin 28 is prevented by the engagement of the bearing end faces 46 with the opposite sides of the top wall 18 around the opening 22, and by the engagement of the centering elements 68 and 70 with the apertures in the bearing races 30 of the upper and lower bearings 24 and 26.

Thus, the caster swivels freely, yet is free of play. The caster is rugged and able to support extermely heavy loads. Full advantage is taken of the ball thrust bearings 24 and 26, which may be of standard types that may readily be purchased in the open market.

Figs. 5–7 illustrate a somewhat modified caster 110. In many respects, the caster 110 is the same as the caster 10 of Figs. 1–4, and to that extent the same reference characters have been applied to Figs. 5–7 as to Figs. 1–4 so that the descriptive matter directed above to Figs. 1–4 may be read upon the corresponding components illustrated in Figs. 5–7.

Thus, the caster 110 employs the same wheel housing 14 and wheel 16 as in Figs. 1–4. A somewhat modified shaft or pin 112 extends through upper and lower ball bearings 114 and 116 which are disposed above and below the top wall 18. The ball bearings 114 and 116 are the same as the ball bearings 24 and 26, but are given different reference characters because the ball bearings 114 and 116 are inverted in position with respect to the bearings 24 and 26. Thus, the race ring 30 of the upper bearing 114 is below the race ring 32, and the housing 40 is in upright position. In the case of the lower bearing 116, the housing 40 is inverted, and the race ring 30 is above the race ring 32. Thus, the end walls 42 of the housing 40 engage the upper and lower sides of the top wall 18 around the opening 22.

The projecting end faces 46 on the upper and lower bearings 114 and 116 are confined between head elements 118 and 120 on the pin or shaft 112. In this case, the upper head element 118 is formed integrally with the shaft 112, while the lower head element 120 actually takes the shape of a nut which is threadedly engaged with a threaded lower end portion 122 on the shaft 112. The nut 120 is adjusted to take up any play between the bearings 114 and 116 and the housing 14, while permitting the housing to swivel freely. The nut 120 may then be staked, welded, or otherwise secured in its adjusted position. Thus, a pair of welds 124 are shown in Fig. 6 to secure the nut 120 in place.

In this case, enlarged centering portions 126 and 128 are formed integrally with the shaft 112 and are received within the upper race 32 of the upper bearing 114 and the lower race 32 of the lower bearing 116. Between the centering portions 126 and 128, the shaft 112 has a reduced intermediate portion 130.

A somewhat modified bushing 132 is provided to center the bearings 114 and 116 with respect to the opening 22. Thus, the bushing 132 has end portions 134 and 136 which are closely received within the apertures 52 in the end walls 42 of the housings 40 on the upper and lower bearings 114 and 116. Since the races 30 of the upper and lower bearings 114 and 116 are closely received within the housings 40 and are adapted to rotate with the housings the bushing 132 is thus centered with respect to the races 30. The bushing 132 has an enlarged intermediate flange 138 which is closely received within the opening 22 in the wheel support 14. As before, the thickness of the flange 138 corresponds to the thickness of the top wall 18 so that the flange is closely confined between the end walls 42 of the upper and lower bearings 114 and 116.

An upwardly extending stem 140 is provided on the shaft 112 and is adapted to be inserted through an opening 142 in a frame plate 144 or the like of a cart or other device. A nut 146 may be mounted on a threaded upper end portion 148 of the shaft 112 to clamp the frame member 144 against the head 118. As shown, a lock washer 150 is interposed between the nut 146 and the frame member 144.

Thus, the housing 40 and the races 30 of the upper and lower bearings 114 and 116 swivel with the wheel support 114, while the races 32 are held in non-rotatable relation to the pin 112. The wheel support 14 is kept from rocking by the engagement of the centering elements 126 and 128 with the races 32 of the upper and lower bearings 114 and 116, and by the engagement of the housing end walls 42 with the upper and lower sides of the top wall 18. The bushing 132 maintains the bearings 114 and 116 in centered relation to the opening 22 in the top wall 18.

The arrangement of Figs. 1–4 has the advantage that the housing 40 of the upper bearing 24 covers the upper race 30 and thus is highly effective in excluding dirt from the upper bearing. On the other hand, the arrangement of Figs. 5–7 has the advantage that the end walls 42 of the bearing housing 40 have a relatively large area of contact with the top wall 18 around the opening 22. Both casters swivel freely, yet are rugged and highly serviceable. Both of them utilize standard ball thrust bearings and thus are easy to manufacture at low cost.

The swivel constructions are arranged so that the balls of the bearings are fully concealed. Thus, no balls are visible. The housings or shells of the bearings seal out dust and dirt. During the course of manufacture, the bearings are normally greased with a permanent, non-running, non-setting grease. The swivel constructions maintain a permanent grease seal, so that relubrication is never necessary. The grease is sealed in by the housings of the bearings and the axial swivel pin.

Various modifications, alternative constructions and equivalents may be employed without departing from the true spirit and scope of the invention as exemplified in the foregoing description and defined in the following claims.

I claim:

1. In a caster, the combination comprising a wheel housing having a top wall made of sheet metal and having an opening therein, upper and lower ball bearing units disposed above and below said top wall, each of said ball bearing units having first and second ball race ring units with balls therebetween, each of said race ring units having an opening therein aligned with said opening in said top wall but of a substantially smaller diameter, said second race ring unit of said upper ball bearing unit being disposed below said first race ring unit thereof and having a downwardly facing annular surface with an outer portion thereof engaging said top wall around said opening therein and an inner portion of said surface overlapping said opening in said top wall, said second race ring unit of said lower ball bearing unit being disposed above said first race ring unit thereof and having an upwardly facing annular surface with an outer portion engaged with the underside of said top wall around said opening therein and an inner portion overlapping said opening, a shaft extending through said openings in said race ring units and having upper and lower outwardly projecting flange elements on said shaft and engaging the upper side of said upper ball bearing unit and the lower side of said lower ball bearing unit for retaining said units against axial movement, said shaft having upper and lower enlarged centering elements adjacent the lower and upper sides of said flange elements with a reduced shaft portion between said centering elements, said centering elements corresponding in size to and being closely received within said openings in said first race ring units of said upper and lower ball bearing units, one of said flange elements being threadedly mounted on said shaft for adjustment therealong, and a centering bushing received around said reduced shaft portion with clearance therebetween, said bushing having an enlarged central portion corresponding in size to and closely received within said opening in said top wall and of a thickness corresponding to that of said top wall, said central portion being disposed between said inner portions of said downwardly and upwardly facing surfaces on said second race ring units of said upper and lower ball bearing units, said bushing having upper and lower reduced end portions corresponding in size to and closely received within said openings in said second race ring units of said upper and lower ball bearing units.

2. In a caster, the combination comprising a wheel support having a top wall with an opening therein, upper and lower thrust bearing units engaging the upper and lower sides of said top wall around said opening and extending inwardly to overlap said opening, said bearing units having apertures therein aligned with said opening but of a substantially smaller diameter, a shaft extending through said apertures in said bearing units, upper and lower enlarged means on said shaft engaging the upper and lower sides of said upper and lower bearing units for retaining said bearing units against endwise movement relative to said wheel support, said shaft having a reduced intermediate portion, a bushing received around said intermediate portion with clearance therebetween, said bushing having upper and lower end portions corresponding in size to and closely received within said apertures in said upper and lower bearing units, said bushing having an enlarged intermediate flange disposed between said upper and lower bearing units and corresponding in size to and closely received within said opening in said top wall to center said bearing units with respect to said opening.

3. In a caster, the combination comprising a wheel support having a top wall with an opening therein, an upper ball bearing having upper and lower race rings with balls therebetween, said lower race ring having a lower surface engaging said top wall around said opening and extending inwardly to overlap said opening, said upper ball bearing having an inverted cup shaped housing with said upper and lower race rings received therein, said housing having an annular top wall substantially covering said upper race ring, a lower ball bearing having upper and lower race rings with balls therebetween, said lower ball bearing having a cup shaped housing around said race rings with an annular lower wall substantially covering said lower race ring, said upper race ring of said lower ball bearing having an upper surface engaging the underside of said top wall of said wheel support around said opening therein and extending inwardly to overlap said opening, said ball race rings of said upper and lower bearings having apertures aligned with said opening but of a substantially smaller diameter, a pin extending through said apertures and having upper and lower centering means corresponding in size to and closely received within the aperture in the upper race ring of said upper bearing and the aperture in the lower race ring of said lower bearing, said pin having upper and lower enlarged head means thereon engaging said end walls on said housing of said upper and lower bearings to retain said bearings against endwise movement against said wheel support, at least one of said head means being threadedly mounted on said pin for adjustment therealong, said pin having a reduced intermediate portion, and a bushing received around said intermediate portion with clearance therebetween, said bushing having upper and lower end portions corresponding in size to and closely received within said apertures in said lower race ring of said upper bearing and said upper race ring of said lower bearing, said bushing having an enlarged intermediate flange corresponding in size to and closely received within said opening in said top wall to center said ball bearings relative to said opening, said intermediate flange corresponding in thickness to said top wall and being closely received between said lower surface on said lower race ring of said upper bearing and said upper surface on said upper race ring of said lower bearing.

4. In a caster, the combination comprising a wheel support having a top wall with an opening therein, upper and lower ball bearings engaging the upper and lower sides of said top wall around said opening, a pin extending through said ball bearings and said opening and having upper and lower enlarged head means thereon with said ball bearings confined between said head means against endwise movement with respect to said wheel support, each of said ball bearings having a cup shaped housing with upper and lower race rings therein and balls between said race rings, said race rings having openings therein, said cup shaped housings having end walls engaging said top wall around said opening therein, said cup shaped housing of said upper ball bearing being upright in position, said cup shaped housing of said lower ball bearing being inverted in position, said end walls of said cup shaped housings having apertures therein aligned with said opening but of a substantially smaller diameter, said upper race ring of said upper bearing and said lower race ring of said lower bearing having respective upper and lower surfaces engaging said upper and lower head means, said pin having upper and lower centering means thereon adjacent said head means and corresponding in size to and closely received within the openings in said upper race ring of said upper bearing and said lower race ring of said lower bearing, said pin having a reduced intermediate portion, and a bushing received around said intermediate portion with clearance therebetween, said bushing having upper and lower end portions closely received within said apertures in said end walls of said cup shaped housings, said bushing having an enlarged intermediate portion corresponding in size to and closely received within said opening in said top wall to center said bearings with respect to said opening, said intermediate portion of said bushing corresponding in thickness to said top wall and being closely received between said end walls of said cup shaped housings.

5. In a caster, the combination comprising a wheel support having a top wall with an opening therein, upper and lower ball bearings engaging the upper and lower sides of said top wall around said opening, a pin extending through said ball bearings and said opening and having upper and lower enlarged means thereon with said ball bearings confined between said enlarged means against endwise movement with respect to said wheel support, each of said ball bearings having a cup shaped housing with upper and lower race rings therein and balls between said race rings, said bearings having openings therein aligned with said opening in said top wall but of a substantially smaller diameter, said pin having upper and lower centering means thereon adjacent said enlarged means and closely received within said upper race ring of said upper bearing and said lower race ring of said lower bearings, said pin having a reduced intermediate portion, and a bushing received around said intermediate portion with clearance therebetween, said bushing having upper and lower end portions corresponding in size to and closely received within said openings in said bearings, said bushing having an enlarged intermediate portion corresponding in size to and closely received within said opening in said top wall to center said bearings with respect thereto.

6. In a caster, the combination comprising a wheel support having a top wall with an opening therein, upper and lower ball bearings engaging the upper and lower sides of said top wall around said opening, a pin extending through said ball bearings and said opening and having upper and lower enlarged means thereon with said ball bearings confined between said enlarged means against endwise movement with respect to said wheel support, each of said ball bearings having a cup shaped housing with upper and lower race rings therein and balls between said race rings, said race rings having openings therein, said cup shaped housing having end walls engaging said enlarged means on said shaft, said cup shaped housing of said upper ball bearing being inverted in position, said cup shaped housing of said lower ball bearing being upright in position, said bearings having openings therein aligned with said opening in said top wall but of a substantially smaller diameter, said lower race ring of said upper bearing and said upper race ring of said lower bearing having respective lower and upper surfaces engaging the upper and lower sides of said top wall around said opening therein, said pin having upper and lower centering means thereon adjacent said enlarged means and corresponding in size to and closely received within the openings in said upper race ring of said upper bearing and said lower race ring of said lower bearing, said pin having a reduced intermediate portion, and a bushing received around said intermediate portion with clearance therebetween, said bushing having upper and lower end portions corresponding in size to and closely received within the openings in said lower race ring of said lower bearing and said upper race ring of said lower bearing, said bushing having an enlarged intermediate portion corresponding in size to and closely received within said opening in said top wall to center said bearings with respect thereto, said intermediate portion of said bushing corresponding in thickness to said top wall and being closely received between said lower and upper race ring surfaces.

7. In a caster, the combination comprising a wheel support having a plate-like top wall with an opening therein, upper and lower ball bearings engaging the upper and lower sides of said top wall around said openings, a pin extending through said ball bearings and said opening and having upper and lower enlarged means thereon with said ball bearings confined between said enlarged means against endwise movement with respect to said wheel support, each of said ball bearings having a cup-shaped housing with upper and lower race rings therein and balls between said race rings, said bearings having openings therein aligned with said opening in said top wall, said pin having upper and lower centering means thereon adjacent said enlarged means and closely received within said upper race ring of said upper bearing and said lower race ring of said lower bearing, said pin having a reduced intermediate portion, and a bushing received around said intermediate portion with clearance therebetween, said bushing having upper and lower end portions corresponding in size to and closely received within said openings in said bearings, said bushing having an intermediate portion corresponding in size to and closely received within said opening in said top wall to center said bearings with respect thereto.

References Cited in the file of this patent

UNITED STATES PATENTS

| | | |
|---|---|---|
| 1,341,630 | Chesnutt | June 1, 1920 |
| 1,544,682 | Reynolds | July 7, 1925 |
| 1,563,013 | Brunner | Nov. 24, 1925 |
| 1,636,326 | Roe | July 19, 1927 |
| 1,734,363 | Chesnutt | Nov. 5, 1929 |
| 1,958,494 | Pehrsson | May 15, 1934 |